Figure 1:
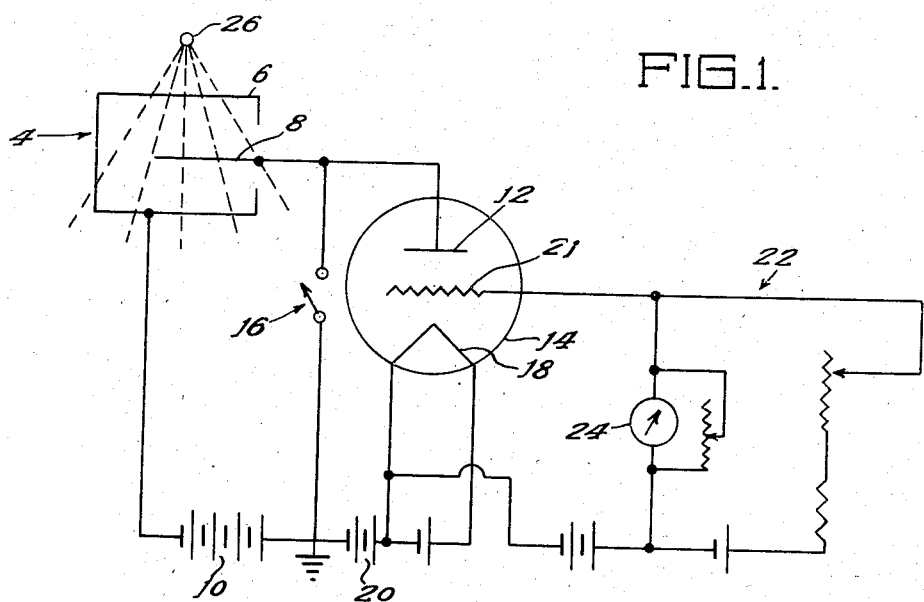

Aug. 16, 1949.  F. R. SHONKA  2,479,271
IONIZATION CHAMBER CIRCUIT
Filed Nov. 21, 1946

INVENTOR.
Francis R. Shonka
BY
Robert A. Lavender
Attorney

Patented Aug. 16, 1949

2,479,271

UNITED STATES PATENT OFFICE 2,479,271

IONIZATION CHAMBER CIRCUIT

Francis R. Shonka, Chicago, Ill., assignor to the United States of America as represented by the United States Atomic Energy Commission Application November 21, 1946, Serial No. 711,433

9 Claims. (Cl. 250—83.6)

This invention relates to an improvement in apparatus for the measurement of radioactivity. More specifically the invention relates to improved apparatus for the measurement of integrated radioactivity over long periods of time.

A common device for the measurement of radioactivity and X-rays is an ionization chamber wherein the incident particles or radiations cause ionization of an ionizing medium and the ions are collected on the electrodes, which are at differing electrical potentials. The current thus produced may be measured by measuring the voltage drop across a resistor in series with the ionization chamber.

Alternatively, no resistor is used and the lowering of the voltage between the electrodes of the ionization chamber resulting from the collection of charge is measured. The amount of charge collected by the ionization chamber constitutes a measure of the total radiation to which the ionization chamber has been exposed during the period in which the charge was so collected. The latter manner of use of the ionization chamber is commonly called an integrated measurement, since it affords a measurement not merely of the instantaneous value of the current flowing through the ionization chamber but a measure of the total or integrated radiation since the charging of the chamber. A device incorporating the integrating principle is particularly useful in monitoring the total radiation to which workers with radioactive materials have been exposed throughout a working day. For example, the ionization chamber may be charged at the commencement of the working day. The difference in voltage between the voltage to which the chamber is originally charged and the voltage which appears across the chamber at any given later time is then a measure of the total radioactivity to which the chamber has been exposed since the time that it was charged.

A common device for continuously measuring the voltage across the ionization chamber is a direct-current electronic amplifier. The control electrode of a vacuum tube is connected to one of the electrodes of the ionization chamber and the cathode of the vacuum tube and the other electrode of the ionization chamber are maintained at fixed potentials. Thus the potential difference between the control electrode and the cathode of the vacuum tube varies in accordance with the variation of the voltage between the electrodes of the ionization chamber. A difficulty commonly experienced with such a device is that the potential of the control electrode of the vacuum tube undergoes variation by reason of ion current within the vacuum tube itself. This difficulty is commonly known as "grid current." If the control electrode (commonly a grid) of the vacuum tube is charged to a negative potential with respect to the cathode, the grid attracts and absorbs positive ions, which tend to reduce the potential difference between the cathode and the control electrode. Such "grid current" is primarily ascribable to residual gas within the vacuum tube. This residual gas may be ionized by the thermal energy of the electrons emitted from the cathode. Despite the greatest care in the making of vacuum tubes for electrometer use, it is found that every vacuum tube demonstrates this phenomenon to some extent. In attempting to make the change of potential of the control electrode dependent only upon the ionization occurring in an ionization chamber, over periods of as long as eight hours or more, serious difficulty arises as a result of the so-called "grid current."

It is, accordingly, an object of the present invention to provide an apparatus and method whereby the collection of ions by the control electrode of a vacuum tube used as a direct-current amplifier with an ionization chamber may be compensated.

It is a further object of this invention to provide a novel ionization chamber adapted to be used in making measurements of integrated radioactivity.

Generally, the teaching of the present invention is that by providing a supplemental radioactive source in addition to the source of the radioactivity under measurement, the ionization chamber may be caused to remove from the control electrode of the direct current amplifier the charge which it accumulates by reason of the collection of charge within the electronic tube.

Figure 2:
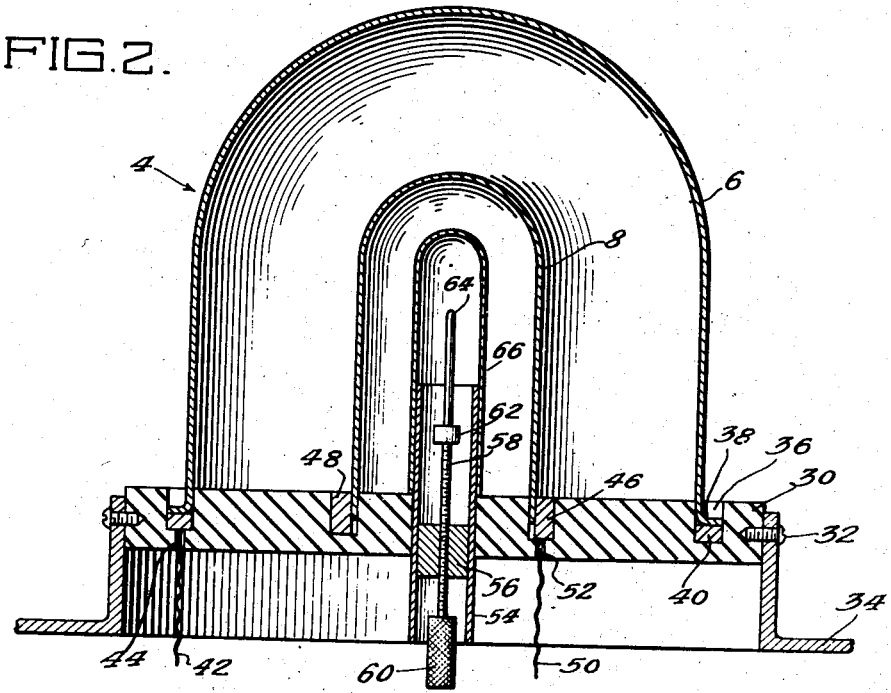

For a more complete understanding of the invention, reference is made to the drawing, in which Fig. 1 is a schematic electrical diagram of an ionization chamber and direct-current amplifier for the measurement of integrated radioactivity, and Fig. 2 is a central vertical cross-sectional view, partly in elevation, of an ionization chamber which is adapted to be used in the device illustrated in Fig. 1.

Referring first to Fig. 1, the ionization chamber is generally designated by the numeral 4. It comprises an outer electrode 6 and an inner electrode 8 with an ionizing medium such as air therebetween. The outer electrode 6 is connected to the negative terminal of a battery 10, the positive terminal of which is grounded. The inner electrode 8 is connected to the control electrode 12 of a triode vacuum tube 14. A switch 16 is connected between the inner electrode 8 and ground and is therefore adapted to short-circuit the inner electrode 8 to ground. As is well-known in the art, such a switch 16 must be of very high insulation resistance in order to prevent leakage of charge across the switch 16. The cathode 18 of the vacuum tube 14 is connected to the positive terminal of a bias battery 20, the negative terminal of which is connected to ground. The variation of the potential of the control electrode 12 with reference to the cathode 18 is used to control the current flowing to the anode 21 which is operated at a positive potential with reference to the cathode 18. The output system for measuring the current flowing to the anode 21 is generally designated by the numeral 22. The output system 22 is of a bridge design, well-known in the art, and therefore will not be further described except to state that the meter 24 gives an indication of the current flowing to the anode 21 and thus of the potential between the control electrode 12 and the cathode 18.

As illustrated in the drawing, the control electrode 12 is the electrode designated as the "plate" of the vacuum tube 14, and the anode 21 is the electrode usually designated as the "grid." The use of the plate as the control electrode 12 to control the flow of current to the grid which is thus used as the anode 21 is well-known in the art as "inverted" operation of the triode tube 14. It will be understood that the present invention is not in any way directly connected with such inverted use of the vacuum tube 14 but is equally applicable to direct-current amplifiers using any electrode as the control electrode and any other electrode as the anode. It will further be understood that the term "grid current" as used herein refers to the collection of charge by the control electrode 12.

The ionization chamber 4 is exposed to the radiation (illustrated by dotted lines) from a source of radioactivity 26. It should be made clear that the source of radioactivity 26 is not the source whose radioactivity is sought to be measured by the device illustrated but is a supplemental source whose purpose will be described below in connection with the theory and operation of the device.

The elements appearing in Fig. 1 having been thus described, the theory of operation may now be set forth. Let it be supposed that the switch 16 is momentarily closed. The inner electrode 8 of the ionization chamber 4 and the control electrode 12 of the vacuum tube 14 are thus placed at ground potential. The outer electrode 6 is at a potential negative with respect to that of the inner electrode 8 by an amount corresponding to the voltage value of the battery 10. This voltage value is the operating potential of the ionization chamber 4. The proper voltage value for the battery 10 is a function of the design and size of the ionization chamber 4, as is well-known in the art. Likewise, upon the closing of the switch 16 the control electrode 12 is placed at a potential negative with respect to the cathode 18 by the amount of the voltage of the bias battery 20. The control electrode 12 of the vacuum tube 14 and the inner electrode 8 of the ionization chamber 4 are, of course, at all times at the same potential, being directly connected together.

Now let it be supposed that the switch 16 is opened. The potential of the inner electrode 8 and the control electrode 12 will remain constant in the absence of collection or loss of charge by this insulated system. However, as stated above, the control electrode 12 collects a certain amount of positive charge by reason of "grid current" in the vacuum tube 14. In the absence of compensation for such charge collection, the potential between the control electrode 12 and the cathode 18, and thus the anode current and the indication of the meter 24, would drift very seriously over a period of the order of hours. But ionization occurs in the ionization chamber 4 by virtue of the radioactive source 26. This ionization causes the collection of negative charge on the inner electrode 8. If the amount of radiation striking the ionization chamber 4 from the radioactive source 26 is so adjusted that the negative charge collected by the inner electrode 8 of the ionization chamber 4 is equal to the positive charge collected by the control electrode 12 of the vacuum tube 14, the potential of both of these elements with respect to ground and thus with respect to the outer electrode 6 and the cathode 18 will remain constant. If the charge collected by the inner electrode 8 is less than that of opposite polarity collected by the control electrode 12, the electrode 12 will become less negative with respect to the cathode 18. On the other hand, if the charge collected by the inner electrode 8 is greater than the charge of opposite polarity collected by the control electrode 12, the control electrode 12 will become more negative with respect to the cathode 18. Thus by proper selection and adjustment of the supplemental source 26, the indication of the meter 24 may be made to be uneffected by the occurrence of "grid current" in the vacuum tube 14. In the absence of ionization in the ionization chamber other than that caused by the source 26, all currents and potentials in the system will remain constant; however, external radioactivity will cause the potential of the inner electrode 8 and the control electrode 12 to become negative with respect to ground, thus decreasing the anode current in the vacuum tube 14 and giving an indication on the meter 24 of the total amount of external radiation to which the ionization chamber 4 has been exposed since the switch 16 was closed and then opened as above described.

In Figure 2 is shown an ionization chamber 4 which has been found advantageous for use in the device illustrated in Figure 1. A disc-shaped polystyrene insulator 30 is fastened by peripheral screws 32 to the top 34 of a chassis, for example of cast aluminum, containing the remainder of the elements illustrated in Figure 1. The top 34 of the chassis is shown fragmentarily in Figure 2 since the construction and mounting of elements other than the ionization chamber 4 are well-known in the art. The outer electrode 6 is an inverted cup of cellulose acetate coated on the inner surface thereof with colloidal graphite to render the surface conducting. It will be obvious to persons skilled in the art that any conducting material which is permeable to the radiations to be counted may be used for the outer electrode 6. The electrode 6 is flared outwardly at the outer edge thereof, as at 38, and the polystyrene insulator 30 has an annular groove 36 in the upper face thereof adapted to receive the flange 38. Seated in the bottom of the groove 36 is an annular metal ring 40, for example of brass. The ring 40 is connected to the interior of the chassis by a wire 42 which is soldered to the ring 40 and extends through a vertical aperture 44 in the insulator 30.

A second annular groove 46 is coaxial with, but of smaller diameter than, the groove 36. The inner electrode 8 of the ionization chamber 4 is similar in shape and composition to the outer electrode 6 described above but it is smaller in size and the conducting coating is on the exterior surface of the inner electrode 8. An annular ring 48 of metal, for example brass, of a thickness smaller than the width of the groove 46 and an inner diameter slightly larger than that of the groove 46 is inserted into the groove 46. The bottom edge of the inner electrode 8 is pressed into the space thus remaining between the inner face of the groove 46 and the inner face of the ring 48. The ring 48 is connected by a wire 50 to the interior of the chassis through a vertical aperture 52 in the insulator 30. Thus contact is established between the respective wires 42 and 50 and the conducting surfaces of the electrodes 6 and 8.

At the center of the insulator 30 is a tube 54 extending axially through the insulator and supported thereby by a forced fit. Within the tube 54 is a solid plug 56 drilled and tapped axially to receive a threaded rod 58 which rod 58 has at the lower end thereof a knurled knob 60 protruding from the lower end of the tube 54. In end-to-end relationship with the rod 58, and secured thereto by a collar 62, is a rod 64 of uranium. The tube 54, for example of brass, is sufficiently thick to absorb beta particles emanating from uranium. Surrounding the rod 64 in all directions other than downward is a cap 66, for example of aluminum, adapted to allow the passage of beta particles but to absorb alpha particles. The tube 54 and the cap 66 constitute a housing for the uranium rod 64 such that the lower portion is impermeable to both alpha and beta particles while the upper portion is permeable to beta particles but impermeable to alpha particles.

The operation and advantage of the device illustrated in Figure 2 may now be explained. As is well-known in the art, uranium emits both alpha particles and beta particles. The alpha particles are very heavily ionizing; however, as is likewise well-known in the art, it is difficult to hold constant the emission of alpha particles from a given radioactive sample without taking extreme precautions as to cleanliness of the sample. It is thus desirable that the ionization caused in the ionization chamber 4 by the uranium rod 64 to be produced solely by beta particles and not by alpha particles. In the ionization chamber of Figure 2, alpha particles emitted by the rod 64 in any direction are absorbed before entering the active region of the ionization chamber 4. The balancing source 26 of Figure 1 thus produces radiation which consists entirely of beta particles whose ionization effect within the active region between the electrodes 6 and 8 is extremely constant at any given position of the rod 64.

The arrangement illustrated in Figure 2 permits adjustment of the amount of ionization in the ionization chamber caused by the rod 64 by turning of the knob 60, thus raising and lowering the rod 64, and determining the proportion of the beta particles which are allowed to radiate into the ionization chamber 4 as opposed to those which are absorbed in the wall of the tube 54. The proper adjustment is preferably reached by observation of the drift of the meter 24 in the absence of radiation under measurement.

Many modifications of, and substitutions for, the apparatus illustrated in the drawing and described above, which utilize the teachings of this invention, will readily occur to persons skilled in the art.

What is claimed is:

1. Apparatus for the measurement of radioactivity comprising, in combination, an ionization chamber having two electrodes at different electrical potentials, an electron-tube having a cathode, an anode, and a control electrode, means for transmitting electrical charge collected by said control electrode to one of said electrodes of the ionization chamber, and a neutralizing source of radioactivity other than the source of radioactivity under measurement adapted to cause collection of charge by said electrode of the ionization chamber, so that charge collected by said control electrode is neutralized by charge collected by the ionization chamber as a result of the presence of the neutralizing source.

2. Apparatus for the measurement of radioactivity comprising, in combination, an ionization chamber having a positive and negative electrode, an electron-tube having a cathode, an anode, and a control electrode, means for transmitting electrical charge collected by said control electrode to the electrode of the ionization chamber having a polarity the same as the polarity of the charge so collected and transmitted, and ionizing means in addition to the radioactivity under measurement, adapted to produce sufficient ionization in said ionization chamber to neutralize the charge collected by said control electrode, so that the potential of said control electrode is not changed by the collection of charge by said control electrode.

3. Apparatus for measurement of integrated radioactivity comprising an ionization chamber having two electrodes, an electron-tube having a control electrode, a cathode and an anode, means for charging the electrodes of the ionization chamber, means for maintaining said cathode at a fixed potential, means for connecting one of said electrodes of the ionization chamber to said control electrode, means for maintaining the other of said electrodes of the ionization chamber at a fixed potential, and ionizing means in addition to the radioactivity under measurement, said ionizing means being adapted to cause collection of charge on said electrode of the ionization chamber so connected to the control electrode, said charge being opposite in polarity, and equal in amount, to the charge collected by said control electrode, so that the potential difference between said control electrode and said cathode is not changed by the collection of charge by the control electrode, but is changed by the occurrence in the ionization chamber of ionization other than that caused by said ionizing means.

4. Apparatus of the class described comprising a direct-current amplifier having an electron-tube containing a control electrode, a cathode and an anode, an ionization chamber having electrodes coupled to the control electrode and to the cathode of the electron-tube, and a source of ionizing radiation adjacent the ionization chamber other than the source of radiation under measurement, the magnitude of said first-mentioned source being such that charges collected by said control electrode are neutralized by charges of opposite polarity collected by said ionization chamber as a result of the presence of the first-mentioned source of radiation.

5. In the method of measuring radioactivity by measuring the lowering of the potential difference between the electrodes of an ionization chamber with a direct-current amplifier having a control electrode, the improvement comprising the step of concurrently exposing the ionization chamber to a source of radioactivity other than the source under measurement, of such intensity that charge collected by the control electrode is neutralized by the collection of charge of opposite polarity by the ionization chamber as a result of exposure to said other source.

6. A method of eliminating variations of potential of the control electrode of an electron-tube caused by the collection of charge by said control electrode, said method comprising the steps of exposing an ionization chamber to a source of radioactivity of intensity sufficient to collect on one of the electrodes of said ionization chamber charge opposite in polarity and equal in amount to the charge collected by the control electrode, and transmitting said charge so collected by said electrode of the ionization chamber to said control electrode.

7. Ionization chamber apparatus for measuring radioactivity comprising a substantially tubular outer conducting electrode permeable to the radioactivity under measurement, a substantially tubular inner conducting electrode within and coaxial with said outer electrode, said inner electrode being spaced from said outer electrode by an annular cavity, and a variable source of radioactivity other than the source under measurement within said tubular inner conducting electrode.

8. An adjustable source of radioactivity comprising, in combination, a substantially tubular housing consisting of a lower portion adapted to absorb beta particles and alpha particles and an upper portion adapted to absorb alpha particles but permeable to beta particles, a rod-like fragment of uranium, means for supporting said fragment axially of said housing, and means for adjusting the position of said fragment along the axis of said housing.

9. An adjustable source of radioactivity comprising, in combination, an elongated housing having a wall portion adapted to absorb beta particles and alpha particles and a longitudinally adjacent second wall portion adapted to absorb alpha particles but permeable to beta particles, an elongated body of a substance emitting alpha particles and beta particles, means for supporting said body longitudinally within the housing, and means for adjusting the longitudinal position of the body within the housing.

FRANCIS R. SHONKA.

REFERENCES CITED

The following references are of record in the file of this patent:

UNITED STATES PATENTS

| Number | Name | Date |
| --- | --- | --- |
| 2,122,222 | Vingerhoets | June 28, 1938 |
| 2,376,196 | Scherbatskoy | May 15, 1945 |